(12) United States Patent　　(10) Patent No.: US 8,869,611 B2
　　Al-Harbi　　　　　　　　　　　　　(45) Date of Patent: 　　Oct. 28, 2014

(54) DUAL MODE WATER LEAK DETECTOR

(76) Inventor: Khaled Ali Al-Harbi, Al Zahra (KW)

( * ) Notice: Subject to any disclaimer, the term of this patent is extended or adjusted under 35 U.S.C. 154(b) by 636 days.

(21) Appl. No.: 13/156,767

(22) Filed: Jun. 9, 2011

(65) Prior Publication Data

US 2012/0312077 A1　　Dec. 13, 2012

(51) Int. Cl.
　　*G08B 21/20*　　　(2006.01)
(52) U.S. Cl.
　　USPC ........................... 73/304 R; 116/109; 116/227
(58) Field of Classification Search
　　USPC ................................. 73/304 R; 116/109, 227
　　See application file for complete search history.

(56) References Cited

U.S. PATENT DOCUMENTS

| | | | |
|---|---|---|---|
| 4,987,408 A * | 1/1991 | Barron | ........................... 340/604 |
| 5,188,143 A | 2/1993 | Krebs | |
| 6,675,826 B1 | 1/2004 | Newman et al. | |
| 6,683,535 B1 | 1/2004 | Utke | |
| 7,084,776 B2 | 8/2006 | Tacilauskas | |
| 7,561,057 B2 * | 7/2009 | Kates | ............................ 340/605 |
| 2010/0109885 A1 * | 5/2010 | Blokker et al. | ............... 340/603 |
| 2010/0249536 A1 * | 9/2010 | Cosentino et al. | ............ 600/300 |

* cited by examiner

*Primary Examiner* — Paul West
(74) *Attorney, Agent, or Firm* — Lowe Hauptman & Ham, LLP

(57) ABSTRACT

A dual mode water leak detector is combined with a HIVAR air condition system or unit. The air conditioning unit or system uses chilled water for cooling or hot water or electric coils for heating and employs means for supplying heated or cooled air into a floor void and channeling return air to designated vents under the floor or through a false ceiling. In addition a water sensor includes an enclosed housing having a bottom or base and four electrical contacts extending through the base and positioned above the floor by about 2 mm by four rubber spacers or feet. In addition a first circuit connects a first and a second contact separated from one another by an airspace to a pair of banana clips for turning the HIVAR system off when water between the first and second contacts is completed due to the presence of water. A second circuit includes a switch and a 60K OHM resistor connecting that circuit to a first of the contacts and second of the contacts when the switch is in a closed position.

5 Claims, 3 Drawing Sheets

DUAL MODE WATER LEAK DETECTOR

FIELD OF THE INVENTION

This invention relates to a dual mode water leak detector and more particularly to a dual mode water leak detector in combination with a HIVAR air conditioning system or unit.

BACKGROUND FOR THE INVENTION

Water detection systems are well known and have been in use for over 25 years. For example a U.S. patent of Barron, U.S. Pat. No. 4,987,408 discloses water sensor unit wherein a plurality of water related appliances or equipment can be simultaneously monitored and in the event of sensing water with respect to any one of the several items being monitored appropriate action is taken such as shutting off the power to the unit and simultaneously shutting off the water supply to that particularly unit. The sensor unit comprises a plurality of electronic circuits which include a "memory" permitting retention of a ground fault even through a power failure for up to 500 hours.

A more recent U.S. Pat. No. 5,188,143 of Krebs discloses a water leak detector that is sensitive to the presence of moisture, having an elongated sensor strip comprising a pair of conductors separated by insulation. Each conductor includes an electrode coupling with a wire lead extending via a cable to an electrical plug. A circuit housing, is provided having an audible alarm operably connected to an electrical socket adapted to detachably connect with the plug. A low voltage battery and auxiliary output socket are carried on the housing and connected with the alarm and the first mention socket whereby the presence of moisture across the pair of sensor conductors activates the alarm. A battery and test pair of electrodes are provided to manually test a battery condition.

In addition, an automatic flood prevention system is described in a U.S. Pat. No. 6,675,826 of Newman et al. As disclosed, a flood prevention system includes a double-latching solenoid valve that shuts off a water supply line in response to a moisture sensor detecting a leak in a plumbing system. The double-latching feature provides the solenoid's plunger with two positions of equilibrium. This minimizes electrical power consumption so that the flood prevention system can be battery operated. To minimize a buildup of hard water deposits, the valve includes a flexible diaphragm and is cycled periodically regardless of whether flooding occurs. The sensor includes multiple methods of mounting to a floor.

A HIVAR air conditioning unit is a recent development attributed to the manufacture of the Hiross range of comfort air conditioners. Such units use chilled water for cooling and hot water or electric coils for heating. The HIVAR units supply air into a floor void and take return air back through floor vents or with the addition of an extension hood draw air back through a false ceiling.

Notwithstanding the above it is presently believed that there is a need and a potential commercial market for an improved water detector. There should be a market for such detectors because they are adapted to operate in a main mode as for example a cooling mode and in a sub-mode or heating mode. In addition, the cost for such systems is relatively small, the units are relatively inexpensive and yet rugged and easy to install and/or replace.

BRIEF SUMMARY OF THE INVENTION

In essence, the present invention contemplates the combination of a HIVAR air conditioning system or unit and a dual mode water leak detector and wherein the dual mode includes a main mode for use with an initial or only sensor and a sub-mode used with additional sensors that are connected through the main sensor to a HIVAR unit.

The HIVAR air conditioning unit uses chilled water for cooling and hot water or electric coils for heating and means for supplying heated or cooled air into a floor void and channeling return air through designated vents under the floor or through a false ceiling. In addition, a water sensor including an enclosed housing having a bottom or base and four electrical contacts extending through the base, and four insulated spacers or feet on the bottom or base of the housing for spacing the contacts at about two mm above a floor or bottom of a cabinet. The water passing through the HIVAR unit is under relatively high pressure. Thus, when a leak occurs due to a broken pipe or hose, water flows down to a floor or bottom of a cabinet and makes contact with the two electrodes to shut the unit down. The combination also includes a first circuit including a pair of banana clips connecting a first and a second contact separated from one another by an air space to the banana clips for turning the HIVAR system off when water between the first and second contacts completes a connection to the HIVAR unit. Additional banana clips may also be used to connect the sensor to the HIVAR unit and also to connect multiple sensors together. In addition, a second circuit, and means for turning the HIVAR system off, a switch and a 60K OHM resistor connects the circuit to the first of the contacts and a second of the contacts when the switch is in a closed position to complete the circuit by connecting the first and second contacts through the 60K OHM resistor and to the banana clips to the means for turning the HIVAR system off and wherein the 60K OHM resistor is removed from the circuit when the mode selection switch is in an open position.

The invention will now be described in connection with the accompanying drawings wherein like reference numerals have been used to indicate like parts.

DESCRIPTION OF THE PREFERRED EMBODIMENTS OF THE INVENTION

Figure 1:
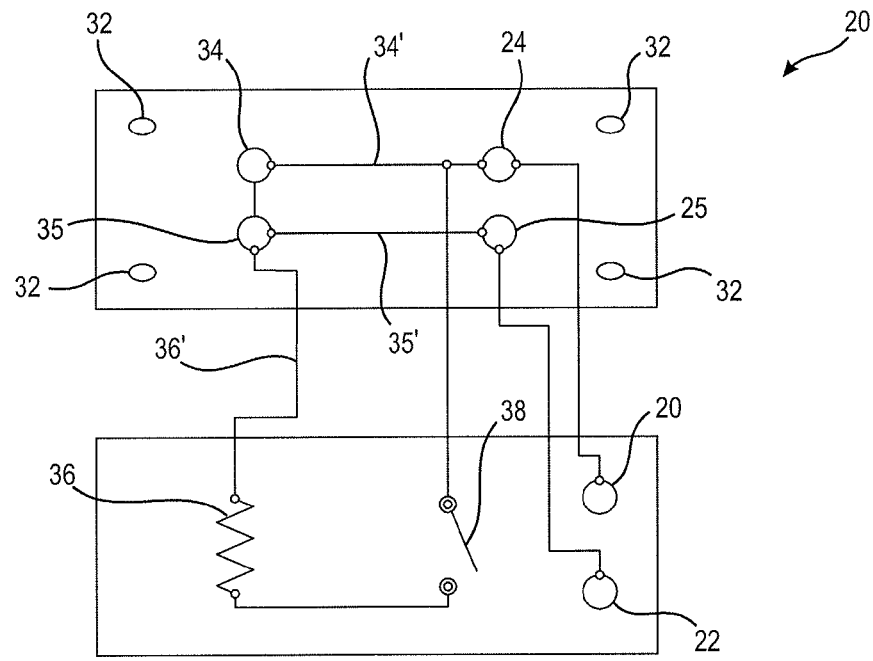
FIG. 1 is a circuit diagram of a leak detector as used in the combination in accordance with the present invention.
Figure 2:
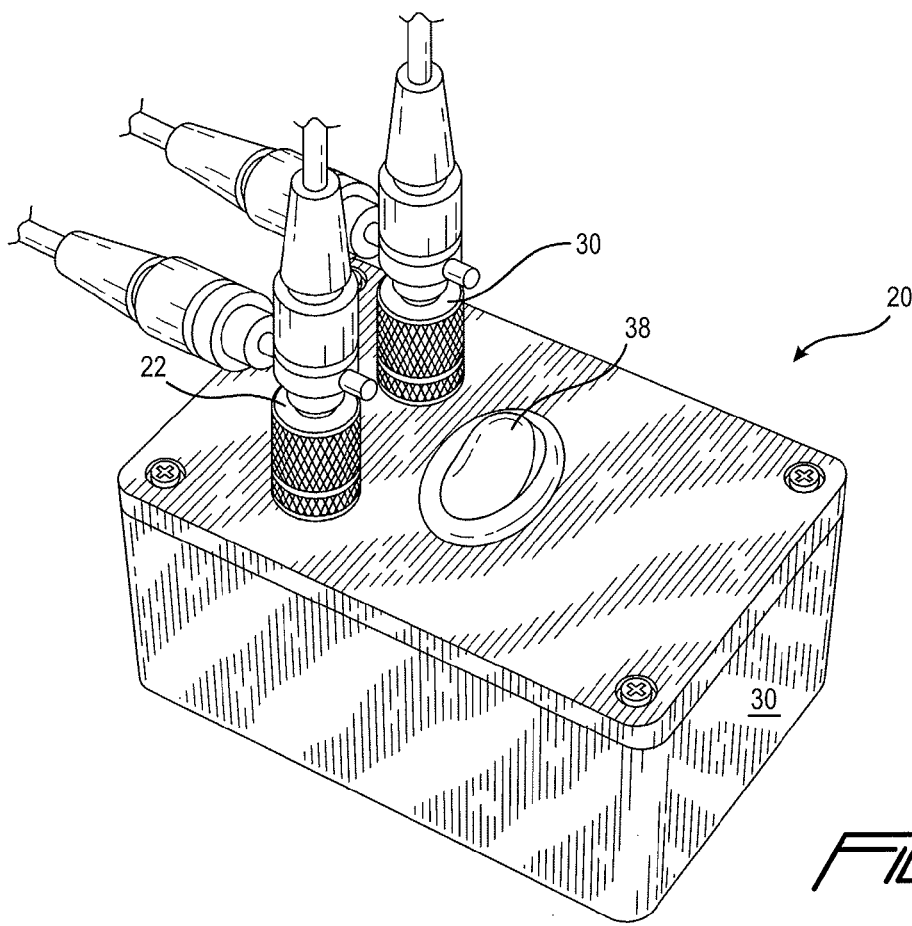
FIG. 2 is a perspective view taken from a top of a leak detector described in connection with FIG. 1.
Figure 3:
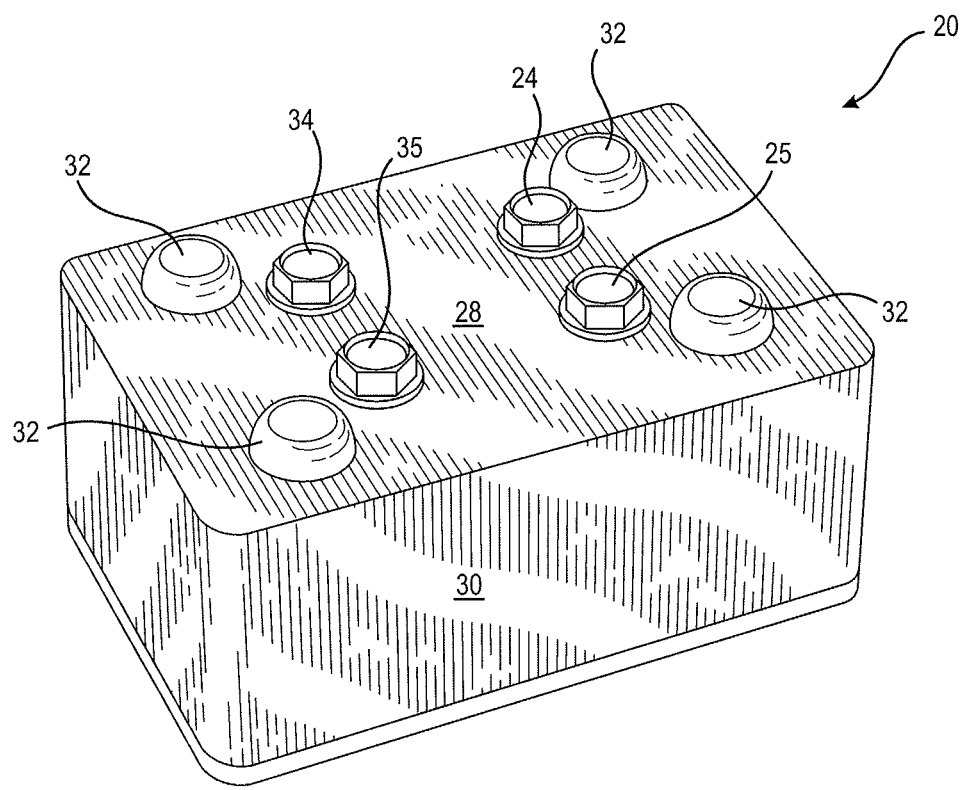
FIG. 3 is a perspective view taken from the bottom of the leak detector shown in FIG. 2.

As illustrated in FIGS. 1-3, a water leak sensor 20 includes a pair of 5V banana plugs 22, 22' on a top surface (see FIG. 2) of the leak sensor 20. The banana connectors 23 are shown inserted in the banana plugs 22 as shown in FIG. 2. The banana plugs 22 are connected to first and second downwardly projected water contacts 24 and 25 that extend through and below a bottom surface 28 of a housing 30. A third and a fourth contacts, 34 and 35, also extend downwardly through the bottom surface 28 of the housing 30.

The contact 34 is connected inside of the housing 30 to the contact 24 and the contact 35 is connected to the contact 25 by a wire or the like. The bottom surface 28 of the housing 30 also includes four ceramic, rubber or neoprene spacers 32 or feet that position the downwardly extending contacts 24, 25, 34 and 35 at a distance of about 2 mm above a floor or an inner surface of the bottom of a cabinet.

As shown in FIG. 1 a circuit in use for a main mode of operation includes a 60K OHM resistor 36 and switch 38 that when closed connects the resistor to the contacts 24 and 25. The contacts 34 and 35 are each connected to the connectors 24 and 25 respectively by as pair of wires 34' and 35' inside of the housing 30. As illustrated, the resistor 36 is connected by a wire 36' to the contact 35 and the switch 38 is connected to the wire 34' or contact 24. Thus, when the switch 38 is closed there is a 60K OHM resistor in the circuit between the contacts 34 and 35 and when the switch is open there is only a nominal resistance between the water sensors.

Referring now to FIGS. 2 and 3 the housing 30 includes an upper surface or connector 31 that is held in place by four or more Philips head screws and includes a switch 38 and banana plugs 20 and 22. The bottom or bottom surface includes the contacts 25, 25', 34 and 35 with spacers or feet 32 to position the contacts about 2 mm above the floor or bottom of a cabinet. The banana clips 20", 22' are connected to the HIVAR unit and when water completes an electrical connection between contacts 24 and 25 or between 34 and 35, the circuit is completed and shuts down the HIVAR unit.

Figure 4:
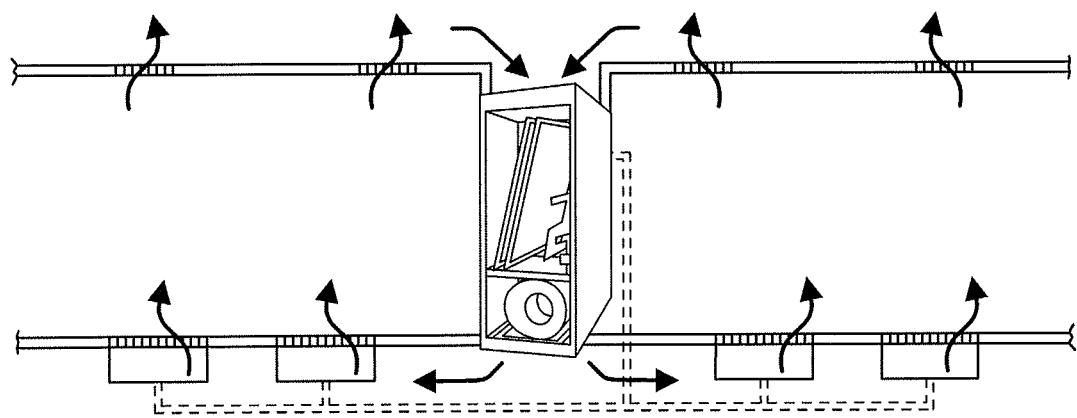
FIG. 4 is an air circulation diagram for a HIVAR air conditioning system in accordance with the present invention.
Figure 5:
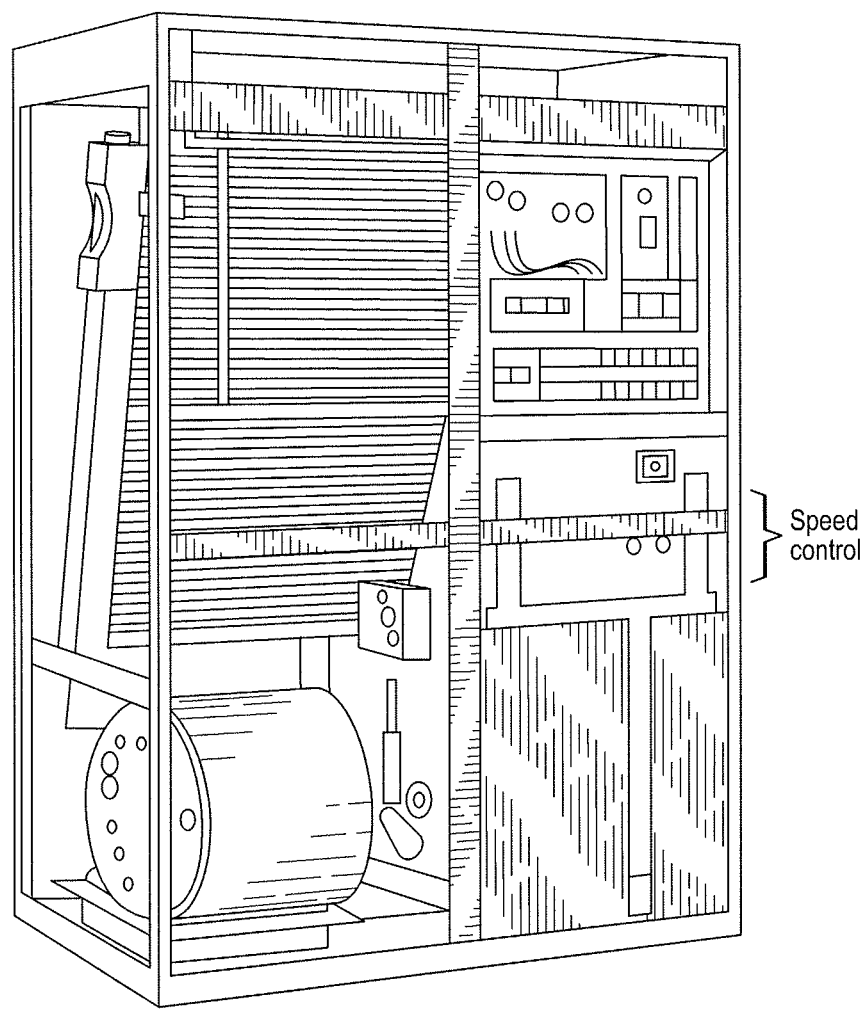
FIG. 5 is a perspective view that shows a HIVAR air conditioning unit with a variable speed fan and control.

FIGS. 4 and 5 shows a HIVAR unit 40 and an air circulating diagram where the air flow is fed into a void below the floor and a return of air through a false ceiling. As shown in FIG. 5, a HIVAR unit 40 includes a variable speed control 42 and fan 44 for varying the volume of air flowing to match the environmental requirements. In the system, wired modules continuously monitor and control the air temperature in the floor plenum and in the ambient. Further, high efficiency filters provide air cleanliness. In one installation two line microprocessors continuously monitor the spaces served and in the floor void. As the demand changes, the unit opens or closes a control damper in accordance with a chosen set point. The unit also has an on/off switch, fan speed and temperature adjustment all connected to a HIVAR unit for increased monitoring and control capabilities.

In designing a leak detector for a HIVAR unit, it was early recognized that a 60K ohm resistor was needed in the circuit for the leak detector to work and without the 60K ohm resistor, the detector would not work. It was also recognized that a water leak might occur in any one or even in multiple locations. For example, a high-power water supply, as for example 12 bars could rupture a 2 inch pipe particularly a flexible pipe, and would within 20 or more seconds cause a considerable volume of water to flow into the area.

However, when multiple sensors each with a 60 K ohm resistor were coupled together they shut the HIVAR unit down even without a leak. Therefore, when multiple detectors are used all except the first or main detector are switched to a sub-mode i.e. without the 60K ohm resistor and thus works in the same manner as incorporating one 60K ohm resistor while the etc. detectors are connected in parallel to the first detector that incorporates the 60K ohm resistor.

Finally, the HIVAR system in accordance with a preferred embodiment of the invention includes a sound attenuator for each of a number of floor grills. The attenuator includes a galvanized steel box lined with sound absorbing materials as for example expanded polyurethane and is preferably combined with a dust collection tray.

While the invention has been described in connection with its preferred embodiment it should be recognized that changes and modifications may be made therein without departing from the scope of the appended claims.

What is claimed is:

1. A dual mode water leak detector in combination with a HIVAR air conditioning system, said combination comprising:
   a HIVAR air conditioning unit that uses chilled water for cooling and hot water or electric coils for heating and means for supplying heated or cooled air into a floor void and channeling return air through designated vents under the floor or through a false ceiling;
   a water sensor including an enclosed housing having a bottom or base and four electrical contacts extending through said base, and four insulated spacers or feet on the bottom or base of said housing for spacing said contacts at about 2 mm above a floor or bottom of a cabinet;
   a first circuit including a pair of banana clips, said first conduit connecting a first and a second contact separated from one another by an airspace to said banana clips for turning said HIVAR system off when water between said first and second contacts completes a circuit with to the HIVAR unit;
   a second circuit, and means for turning the HIVAR system off, a switch and a 60K OHM resistor connected in said second circuit to said first of said contacts and said second of said contacts when said switch is in a closed position to complete said second circuit by connecting said first and second contacts through said 60K OHM resistor through said banana clips to said means for turning said HIVAR system off;
   wherein said 60K OHM resistor is removed from said circuit when said switch is in an open position, and
   wherein said enclosed housing includes a removable top which includes said switch and a pair of banana connectors.

2. A dual mode water leak detector in combination with a HIVAR air conditioning system according to claim 1 and in which said insulated spacers are made of rubber.

3. A dual mode water leak detector in combination with a HIVAR air conditioning system according to claim 1 in which said insulated spacers are made of neoprene.

4. A dual mode water leak detector in combination with a HIVAR air conditioning system according to claim 3 which includes a variable speed control to vary the volume of air flow to match the environmental requirements.

5. A dual mode water leak detector in combination with a HIVAR air conditioning system, said combination consisting of:
   a HIVAR air conditioning unit that uses chilled water for cooling and hot water or electric coils for heating and means for supplying heated or cooled air into a floor void and channeling return air through designated vents under the floor or through a false ceiling;
   a water sensor including an enclosed housing having a bottom or base and four electrical contacts extending through said base, and four insulated spacers or feet of rubber on the bottom or base of said housing for spacing said contacts at about 2 mm above a floor or bottom of a cabinet;
   a first circuit including a pair of banana clips, said first circuit connecting a first and a second contact separated from one another by an airspace to said banana clips for turning said HIVAR system off when water between said first and second contacts completes a circuit with to turn said HIVAR unit;
   a second circuit including means for turning the HIVAR system off, a switch and a 60K OHM resistor connected in said second circuit to said first of said contacts and said second of said contacts when said switch is in a closed position to complete said second circuit by connecting said first and second contacts through said 60K OHM resistor through said banana clips to said means for turning said HIVAR system off;

wherein said 60K OHM resistor is removed from said circuit when said switch is in an open position and in which said insulated spacers are made of rubber and in which said enclosed housing includes a removable top and in which the HIVAR unit includes a variable speed control to vary the volume of air flowing to match the environmental requirements and a sound attenuator and filter for reducing the noise of said system and providing clean air.

\* \* \* \* \*